(No Model.)
A. JANIN.
ART OF AMALGAMATING SILVER ORE.
No. 481,031. Patented Aug. 16, 1892.
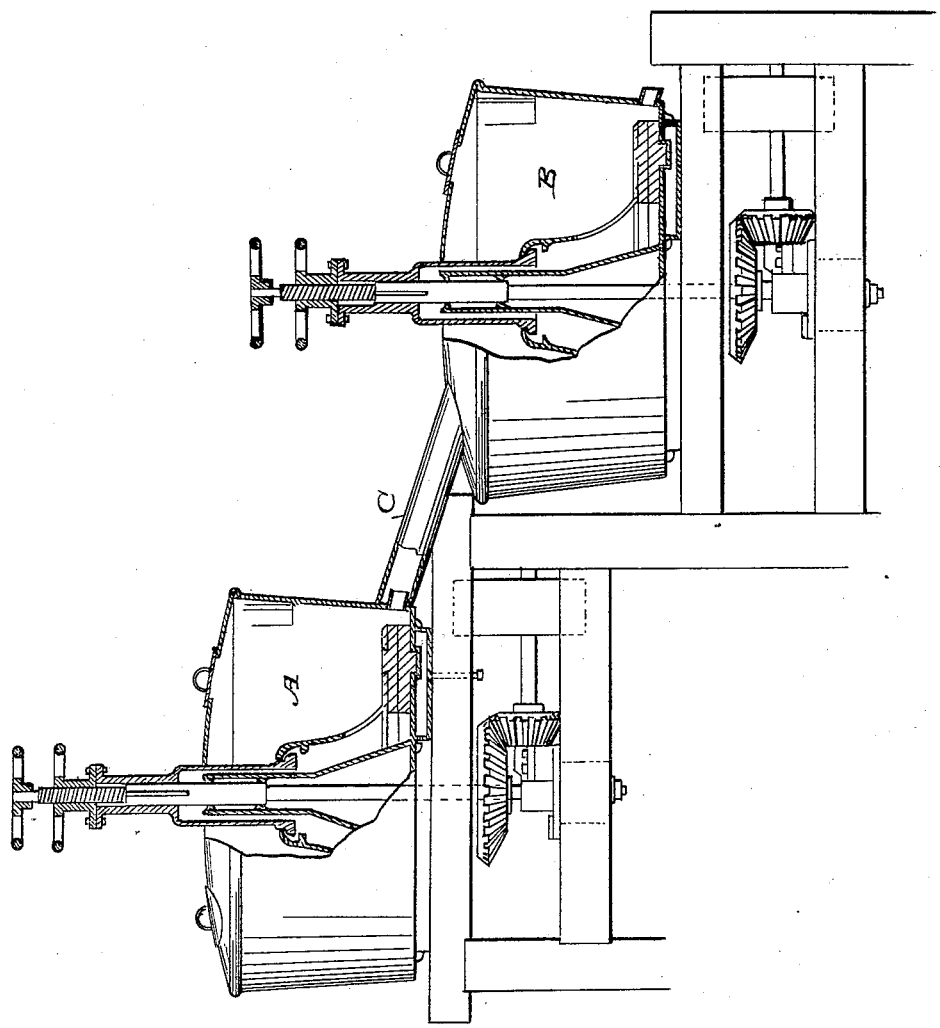
Witnesses,
H. Rouse
J. A. Bayless
Inventor,
Alexis Janin
By Dewey & Co.
Attys.

UNITED STATES PATENT OFFICE.

ALEXIS JANIN, OF SAN FRANCISCO, CALIFORNIA.

ART OF AMALGAMATING SILVER ORE.

SPECIFICATION forming part of Letters Patent No. 481,031, dated August 16, 1892.

Application filed May 6, 1892. Serial No. 432,042. (No specimens.)

*To all whom it may concern:*

Be it known that I, ALEXIS JANIN, a citizen of the United States, residing in the city and county of San Francisco, State of California, have invented an Improvement in the Art of Amalgamating Silver Ores; and I hereby declare the following to be a full, clear, and exact description of the same.

My invention relates to the art of amalgamation.

It consists in the processes hereinafter fully described, and specifically pointed out in the claims.

I have discovered that finely-divided metallic copper or cement-copper in such condition as it is obtained when precipitated from the solution of a copper salt by metallic iron has a powerful effect in desulphurizing and rendering more easily amalgamated sulphides of silver when added to and stirred together with ore containing those minerals and in the presence of an acid salt—such as alum or other salt of alumina—or of ferrous chloride or sulphate or chloride of manganese. Other acid salts—such as sodium sulphite and bisulphate of soda—also promote the desulphurizing action of the finely-divided copper and the subsequent amalgamation of the silver by mercury. It is essential that the copper be present in the finely-divided condition described, as copper-filings or larger pieces of copper would not have the same effect. I apply these facts to the amalgamation of silver ores in pans.

If the ore contain no gold, I usually prepare the chemical reagents in the following manner: I dissolve in a bucket or tub a quantity of sulphate of copper generally equal to four or five pounds per ton of ore to be treated, together with an equal weight of sodium chloride and the necessary amount of water to form a solution. To this I add two or three pounds of iron-borings or an excess of iron in larger pieces and one or two pounds of sulphuric acid to hasten the precipitation of the copper or to form an excess of ferrous chloride through the action of the salt and sulphuric acid on the metallic iron present. The precipitation of the copper is hastened and rendered more complete by heating the solution with steam or otherwise. When the copper is precipitated, the contents of the tub or bucket are thrown into the amalgamating-pan containing the ore. The pulp is heated by means of steam, and the stirring of the ore, with simultaneous grinding of the pulp, if it be not already sufficiently fine, continues for one or two hours. Mercury is then added and the amalgamation is concluded in the usual manner. When the ore also contains gold, I find it advantageous to allow no ferrous chloride to enter the pan, as the basic ferric chloride formed by the partial oxidation of the ferrous chloride solution, unless an excess of acid be present, impedes the amalgamation of the gold, although it does not effect the amalgamation of the silver minerals. Therefore when gold is present in the ore I add no sodium chloride to the solution of sulphate of copper and only a little sulphuric acid to promote the precipitation of the copper by iron. When the copper is precipitated, I throw away the solution of sulphate of iron, which does not act as energetically in conjunction with the finely-divided copper as the other acid salts I have mentioned. The copper and smaller pieces of undissolved iron are thrown into the pan with the ore, and there is added at the same time eight or ten pounds per ton of ore of alum or other acid salt previously mentioned, except ferrous chloride, and the treatment of the ore is carried on as already described. The exact amount of cement-copper to be used will vary with different ores, according to their richness and the amount of sulphides of the baser metals present, and it is to be determined in any given case by a preliminary trial, using gradually-increasing quantities of the chemical reagents until the best results are obtained. When sulphate of copper and sodium chloride are added directly to silver ore in an iron amalgamating-pan, there is formed only a small amount of cement-copper, as the iron of the pan is always coated with rust and scale and protected by the ore itself. Moreover, as there is constantly a certain amount of mercury and amalgam in the pan the copper precipitated from its solution in contact with mercury forms to a great extent copper amalgam, which is only slightly efficacious in desulphurizing silver minerals. When the gangue of the ore contains carbonate of lime or protoxide of manganese, which precipitate copper from a solution of blue-stone and sodium chloride in the cold or when slightly heated, the action of those chemicals is prevented. Moreover, neither cupric chloride nor cuprous chloride act nearly as energetically in rendering more easily amalgamated minerals of silver as does finely-divided copper used in conjunction with an acid salt in the manner I have described. Metallic copper is only slowly amalgamated by the small amount of mercury remaining in a properly-constructed pan when the ore is first charged, whereas it attacks and desulphurizes energetically the silver minerals present. The solution of ferrous chloride is not decomposed, by carbonate of lime, except at a very high temperature and after prolonged contact. The best results, however, are obtained and the smallest amount of cement-copper will suffice when the ore is first subjected to the action of precipitated metallic copper and an acid salt in a pan or mixing-tub into which no mercury is introduced and then discharged into an amalgamating-pan in which mercury is added and the amalgamation concluded in the usual way. When the gangue of the ore contains no substance which will decompose the copper solution, sulphate of copper and salt, together with finely-divided metallic iron or zinc, may be added directly to the ore in the first pan and metallic copper precipitated from the solution in contact with the ore with simultaneous formation of ferrous chloride or chloride of zinc, and there may be made a further addition of an acid salt; but I prefer the method of precipitating the copper from its solution first and adding it to the ore afterward, as the precipitation is more rapid and thorough and insures the complete decomposition of the chloride of copper, which would cause a loss of mercury through formation of oxichloride of mercury in the subsequent amalgamation.

In the drawings, A represents the first pan, in which the ore is subjected to the chemical action of the cement-copper and acid salt, and B the second pan, in which the amalgamation is carried out. These pans are of the ordinary form and are connected by a chute C.

Having thus described my invention, what I claim as new, and desire to secure by Letters Patent, is—

1. The improvement in the art of amalgamating silver ores, which consists in adding to the ore precipitated metallic copper and an acid salt, heating and stirring the pulp until the silver minerals are desulphurized, then adding mercury, and concluding the amalgamation in the usual manner.

2. The improvement in the art of amalgamating silver ores, which consists in subjecting the ore in a preparatory pan or mixing-tub to the action of precipitated metallic copper and an acid salt, heating and stirring the pulp until the silver minerals are desulphurized, then discharging the pulp into an amalgamating-pan, adding mercury, and concluding the amalgamation in the usual manner.

3. The improvement in the art of amalgamating silver ores, which consists in adding to the ore in a preparatory or mixing tub sulphate of copper and salt, together with finely-divided metallic iron or zinc, heating and stirring the pulp until the silver minerals are desulphurized, then discharging the pulp into an amalgamating-pan, adding mercury, and concluding the amalgamation in the usual way.

In witness whereof I have hereunto set my hand.

ALEXIS JANIN.

Witnesses:
S. H. NOURSE,
J. A. BAYLESS.